US008595296B2

(12) United States Patent
Berberian et al.

(10) Patent No.: US 8,595,296 B2
(45) Date of Patent: Nov. 26, 2013

(54) METHOD AND APPARATUS FOR AUTOMATICALLY DATA STREAMING A MULTIPARTY CONFERENCE SESSION

(75) Inventors: Paul Berberian, Boulder, CO (US); Todd Vernon, Lafayette, CO (US)

(73) Assignee: Open Invention Network, LLC, Durham, NC (US)

( * ) Notice: Subject to any disclaimer, the term of this patent is extended or adjusted under 35 U.S.C. 154(b) by 805 days.

(21) Appl. No.: 11/957,599

(22) Filed: Dec. 17, 2007

(65) Prior Publication Data

US 2008/0104171 A1 May 1, 2008

Related U.S. Application Data

(63) Continuation of application No. 09/794,002, filed on Feb. 28, 2001, now Pat. No. 7,328,239.

(60) Provisional application No. 60/199,077, filed on Apr. 20, 2000, provisional application No. 60/186,033, filed on Mar. 1, 2000.

(51) Int. Cl.
*G06F 15/16* (2006.01)
(52) U.S. Cl.
USPC ............ 709/204; 709/217; 709/231; 709/245
(58) Field of Classification Search
USPC ......... 709/203–205, 217–219, 231, 245, 249; 715/753, 756, 758; 725/106; 379/88.13, 88.14, 88.17, 158; 370/352
See application file for complete search history.

(56) References Cited

U.S. PATENT DOCUMENTS

| 5,148,429 A | 9/1992 | Kudo et al. |
| 5,359,598 A | 10/1994 | Steagall et al. |
| 5,440,699 A | 8/1995 | Farrand et al. |
| 5,483,568 A | 1/1996 | Yano et al. |
| 5,483,587 A | 1/1996 | Hogan et al. |
| 5,483,588 A | 1/1996 | Eaton et al. ............... 379/202.01 |
| 5,506,954 A | 4/1996 | Arshi et al. ................... 345/501 |
| 5,530,795 A | 6/1996 | Wan |

(Continued)

FOREIGN PATENT DOCUMENTS

| EP | 0622931 A2 | 3/1994 |
| EP | 0779732 A2 | 12/1996 |

(Continued)

OTHER PUBLICATIONS

Odlyzko, P., et al., "Variable Rate Block Encoding and Adaptive Latency Control for Packet Voice Communications," Motorola Technical Developments, Motorola Inc. pp. 23:48-55 (1994).

(Continued)

*Primary Examiner* — Melvin H Pollack
(74) *Attorney, Agent, or Firm* — Haynes and Boone, LLP

(57) ABSTRACT

A system, method and computer program product having instructions stored thereon for automatically data streaming a multiparty conference session comprises receiving an Internet-based interface at a session moderator, said Internet-based interface configured for said session moderator to enter a request for data streaming a multiparty conference session, automatically establishing a data stream of said conferencing session, without any human intervention, wherein establishing said automated data stream includes: recording the multiparty conference session, and data streaming the multiparty conference session to listen-only participants thereby enabling listen-only participants to connect to the multiparty conference session without using additional conference ports and/or conference resources.

47 Claims, 8 Drawing Sheets

(56) References Cited

U.S. PATENT DOCUMENTS

| | | | | |
|---|---|---|---|---|
| 5,546,449 | A | 8/1996 | Hogan et al. | 379/202.01 |
| 5,559,875 | A | 9/1996 | Bieselin et al. | |
| 5,583,993 | A | 12/1996 | Foster et al. | |
| 5,588,139 | A | 12/1996 | Lanier et al. | 703/1 |
| 5,608,426 | A | 3/1997 | Hester | |
| 5,608,872 | A | 3/1997 | Schwartz et al. | |
| 5,617,423 | A | 4/1997 | Li et al. | |
| 5,619,554 | A | 4/1997 | Hogan et al. | |
| 5,619,555 | A | 4/1997 | Fenton et al. | |
| 5,623,603 | A | 4/1997 | Jiang et al. | |
| 5,634,018 | A | 5/1997 | Tanikoshi et al. | |
| 5,649,104 | A | 7/1997 | Carleton et al. | |
| 5,668,863 | A | 9/1997 | Bieselin et al. | |
| 5,706,502 | A | 1/1998 | Foley et al. | |
| 5,742,670 | A | 4/1998 | Bennett | |
| 5,745,711 | A | 4/1998 | Kitahara et al. | |
| 5,748,898 | A | 5/1998 | Ueda | |
| 5,754,830 | A | 5/1998 | Butts et al. | |
| 5,761,419 | A | 6/1998 | Schwartz et al. | |
| 5,764,901 | A | 6/1998 | Skarbo et al. | |
| 5,778,368 | A | 7/1998 | Hogan et al. | |
| 5,781,909 | A | 7/1998 | Logan et al. | |
| 5,786,814 | A | 7/1998 | Moran et al. | |
| 5,790,637 | A | 8/1998 | Johnson et al. | |
| 5,809,247 | A | 9/1998 | Richardson et al. | |
| 5,809,250 | A | 9/1998 | Kisor | |
| 5,812,652 | A | 9/1998 | Jodoin et al. | |
| 5,819,243 | A | 10/1998 | Rich et al. | |
| 5,844,979 | A | 12/1998 | Raniere et al. | |
| 5,857,189 | A | 1/1999 | Riddle | 707/10 |
| 5,859,974 | A | 1/1999 | McArdle et al. | |
| 5,894,558 | A | 4/1999 | Falker | |
| 5,907,324 | A | 5/1999 | Larson et al. | |
| 5,916,302 | A | 6/1999 | Dunn et al. | |
| 5,930,238 | A | 7/1999 | Nguyen | |
| 5,930,473 | A | 7/1999 | Teng et al. | |
| 5,933,417 | A | 8/1999 | Rottoo | |
| 5,940,082 | A | 8/1999 | Brinegar et al. | |
| 5,941,945 | A | 8/1999 | Aditham et al. | 709/205 |
| 5,941,957 | A | 8/1999 | Ingrassia et al. | 709/248 |
| 5,944,791 | A | 8/1999 | Scherpbier | |
| 5,953,506 | A | 9/1999 | Kalra et al. | |
| 5,963,547 | A | 10/1999 | O'Neil et al. | |
| 5,970,065 | A * | 10/1999 | Miloslavsky | 370/352 |
| 5,978,756 | A | 11/1999 | Walker et al. | |
| 5,978,835 | A | 11/1999 | Ludwig et al. | |
| 5,986,655 | A | 11/1999 | Chiu et al. | |
| 5,990,933 | A | 11/1999 | Ozone et al. | |
| 5,991,276 | A | 11/1999 | Yamamoto | |
| 5,991,796 | A | 11/1999 | Anupam et al. | |
| 5,995,606 | A | 11/1999 | Civanlar et al. | |
| 5,995,608 | A | 11/1999 | Detampel et al. | |
| 5,995,951 | A | 11/1999 | Ferguson | |
| 6,018,360 | A | 1/2000 | Stewart et al. | |
| 6,018,774 | A | 1/2000 | Mayle et al. | |
| 6,025,870 | A | 2/2000 | Hardy | 348/14.1 |
| 6,029,127 | A | 2/2000 | Delargy et al. | |
| 6,049,602 | A | 4/2000 | Foladare et al. | |
| 6,061,440 | A | 5/2000 | Delaney et al. | |
| 6,061,717 | A | 5/2000 | Carleton et al. | |
| 6,061,732 | A | 5/2000 | Korst et al. | |
| 6,072,463 | A | 6/2000 | Glaser | |
| 6,100,882 | A | 8/2000 | Sharman et al. | |
| 6,151,621 | A | 11/2000 | Colyer et al. | |
| 6,157,401 | A | 12/2000 | Wiryaman | |
| 6,181,786 | B1 | 1/2001 | Detampel et al. | |
| 6,192,394 | B1 | 2/2001 | Gutfreund et al. | |
| 6,192,419 | B1 | 2/2001 | Aditham et al. | 719/315 |
| 6,237,025 | B1 | 5/2001 | Ludwig et al. | |
| 6,240,444 | B1 | 5/2001 | Fin et al. | |
| 6,263,365 | B1 | 7/2001 | Scherpbier | |
| 6,266,341 | B1 * | 7/2001 | Surprenant et al. | 370/458 |
| 6,282,278 | B1 * | 8/2001 | Doganata et al. | 379/202.01 |
| 6,295,551 | B1 | 9/2001 | Roberts et al. | |
| 6,298,129 | B1 | 10/2001 | Culver et al. | 379/202.01 |
| 6,301,258 | B1 | 10/2001 | Katseff et al. | |
| 6,310,941 | B1 | 10/2001 | Crutcher et al. | |
| 6,321,252 | B1 | 11/2001 | Bhola et al. | 709/204 |
| 6,332,153 | B1 * | 12/2001 | Cohen | 709/204 |
| 6,335,927 | B1 | 1/2002 | Elliott et al. | |
| 6,343,313 | B1 * | 1/2002 | Salesky et al. | 709/204 |
| 6,378,001 | B1 | 4/2002 | Aditham et al. | 719/313 |
| 6,381,568 | B1 | 4/2002 | Supplee et al. | |
| 6,411,988 | B1 | 6/2002 | Tafoya et al. | |
| 6,453,022 | B1 * | 9/2002 | Weinman, Jr. | 379/88.13 |
| 6,463,038 | B1 | 10/2002 | Wilson | |
| 6,477,176 | B1 | 11/2002 | Hamalainen et al. | |
| 6,483,851 | B1 * | 11/2002 | Neogi | 370/466 |
| 6,484,196 | B1 * | 11/2002 | Maurille | 709/206 |
| 6,487,196 | B1 * | 11/2002 | Verthein et al. | 370/352 |
| 6,490,451 | B1 * | 12/2002 | Denman et al. | 455/436 |
| 6,501,763 | B1 | 12/2002 | Bhagavath et al. | 370/432 |
| 6,522,633 | B1 * | 2/2003 | Strawczynski | 370/260 |
| 6,535,909 | B1 | 3/2003 | Rust | 709/204 |
| 6,539,087 | B1 | 3/2003 | Walsh et al. | 379/202.01 |
| 6,542,936 | B1 | 4/2003 | Mayle et al. | |
| 6,567,807 | B1 | 5/2003 | Robles et al. | 707/10 |
| 6,584,493 | B1 | 6/2003 | Butler | 709/204 |
| 6,598,074 | B1 | 7/2003 | Moller et al. | |
| 6,606,305 | B1 * | 8/2003 | Boyle et al. | 370/260 |
| 6,611,519 | B1 * | 8/2003 | Howe | 370/386 |
| 6,615,212 | B1 * | 9/2003 | Dutta et al. | 707/10 |
| 6,657,975 | B1 * | 12/2003 | Baxley et al. | 370/260 |
| 6,671,262 | B1 * | 12/2003 | Kung et al. | 370/260 |
| 6,687,877 | B1 | 2/2004 | Sastry et al. | 715/512 |
| 6,697,869 | B1 * | 2/2004 | Mallart et al. | 709/231 |
| 6,701,366 | B1 | 3/2004 | Kallas et al. | 709/227 |
| 6,704,798 | B1 * | 3/2004 | Mogul | 709/246 |
| 6,707,797 | B1 * | 3/2004 | Gardell et al. | 370/260 |
| 6,714,536 | B1 * | 3/2004 | Dowling | 370/356 |
| 6,715,145 | B1 * | 3/2004 | Bowman-Amuah | 718/101 |
| 6,728,221 | B1 * | 4/2004 | Shaffer et al. | 370/260 |
| 6,728,784 | B1 | 4/2004 | Mattaway | |
| 6,739,877 | B2 | 5/2004 | Bailey et al. | 434/262 |
| 6,772,436 | B1 * | 8/2004 | Doganata et al. | 725/106 |
| 6,779,030 | B1 * | 8/2004 | Dugan et al. | 709/223 |
| 6,782,531 | B2 * | 8/2004 | Young | 717/130 |
| 6,785,244 | B2 * | 8/2004 | Roy | 370/252 |
| 6,785,369 | B2 * | 8/2004 | Diamond et al. | 379/88.22 |
| 6,802,041 | B1 | 10/2004 | Rehm | 715/500.1 |
| 6,804,244 | B1 * | 10/2004 | Anandakumar et al. | 370/395.21 |
| 6,856,616 | B1 * | 2/2005 | Schuster et al. | 370/352 |
| 6,892,226 | B1 * | 5/2005 | Tso et al. | 709/218 |
| 6,907,449 | B2 * | 6/2005 | Srinivasan | 709/204 |
| 6,915,336 | B1 | 7/2005 | Hankejh et al. | 709/219 |
| 6,921,331 | B2 | 7/2005 | Gatto et al. | 463/6 |
| 6,961,416 | B1 | 11/2005 | Summers et al. | 379/202.01 |
| 6,985,571 | B2 * | 1/2006 | O'Malley et al. | 379/202.01 |
| 6,987,756 | B1 * | 1/2006 | Ravindranath et al. | 370/352 |
| 7,006,616 | B1 * | 2/2006 | Christofferson et al. | 379/202.01 |
| 7,006,617 | B1 * | 2/2006 | Dal Farra et al. | 379/206.01 |
| 7,058,036 | B1 * | 6/2006 | Yu et al. | 370/335 |
| 7,075,918 | B1 * | 7/2006 | Kung et al. | 370/352 |
| 7,079,495 | B1 * | 7/2006 | Pearce et al. | 370/260 |
| 7,085,243 | B2 | 8/2006 | Decker et al. | 370/261 |
| 7,092,821 | B2 | 8/2006 | Mizrahi et al. | 702/1 |
| 7,116,656 | B1 * | 10/2006 | Gardell et al. | 370/352 |
| 7,124,164 | B1 | 10/2006 | Chemtob | 709/204 |
| 7,136,062 | B1 | 11/2006 | Butler | 345/422 |
| 7,145,898 | B1 * | 12/2006 | Elliott | 370/352 |
| 7,149,359 | B1 | 12/2006 | Omoigui | 382/219 |
| 7,149,724 | B1 | 12/2006 | Flanagan et al. | 705/80 |
| 7,151,770 | B1 * | 12/2006 | Clark | 370/352 |
| 7,165,213 | B1 | 1/2007 | Busey | 715/500.1 |
| 7,283,518 | B2 * | 10/2007 | Vikberg et al. | 370/352 |
| 7,428,303 | B2 * | 9/2008 | Campbell et al. | 379/265.09 |
| 7,487,210 | B2 * | 2/2009 | Ludwig et al. | 709/204 |
| 7,835,344 | B1 * | 11/2010 | Bartholomew et al. | 370/352 |
| 7,839,803 | B1 * | 11/2010 | Snelgrove et al. | 370/260 |
| 7,948,968 | B2 * | 5/2011 | Voit et al. | 370/352 |
| 8,036,214 | B2 * | 10/2011 | Elliott et al. | 370/356 |
| 2002/0009184 | A1 * | 1/2002 | Shnier | 379/142.01 |
| 2002/0083166 | A1 * | 6/2002 | Dugan et al. | 709/223 |
| 2002/0112004 | A1 | 8/2002 | Reid et al. | 709/205 |

(56) References Cited

U.S. PATENT DOCUMENTS

| | | | |
|---|---|---|---|
| 2002/0129106 A1 | 9/2002 | Gutfreund | 709/205 |
| 2002/0142842 A1 | 10/2002 | Easley et al. | 463/42 |
| 2003/0023686 A1 | 1/2003 | Beams et al. | 709/205 |
| 2003/0025722 A1 | 2/2003 | Cliff et al. | 345/700 |
| 2003/0046344 A1 | 3/2003 | Kumhyr et al. | 709/205 |
| 2003/0055899 A1 | 3/2003 | Burger et al. | |
| 2003/0187924 A1 | 10/2003 | Riddle | 709/204 |
| 2010/0296508 A1* | 11/2010 | Lewis | 370/352 |
| 2010/0316046 A1* | 12/2010 | Kalmanek et al. | 370/352 |

FOREIGN PATENT DOCUMENTS

| | | | |
|---|---|---|---|
| EP | 0874323 | A1 | 10/1998 |
| EP | 0908824 | A2 | 4/1999 |
| EP | 0957437 | A2 | 11/1999 |
| WO | WO 99/26153 | A2 | 5/1999 |
| WO | WO 00/22802 | A2 | 4/2000 |
| WO | WO 00/56050 | A1 | 9/2000 |
| WO | WO 00/58050 | A1 | 9/2000 |
| WO | WO 01/69418 | A1 | 9/2001 |

OTHER PUBLICATIONS

Jacobs, S., et al., "Filling HTML Forms Simultaneously: CoWeb-Architecture and Functionality," Computer Networks and ISDN Systems 28(11): 1385-1395 (1996).

Moralee D., "Sdentific Graphics and Visualization Come to the Internet", Scientific Computing World, Mar. 1, 1995, p. 31, 33/34, 36 XP000571217 "p. 34, '2: The Internet carries videoconferencing MICE across Europe".

Hao MC et al, "Collaborative Computing: A Multi-Client Multi-Server Environment", Conference on Organizational Computing Systems, Milpitas, CA. Aug. 123-16, 1995 Comstodc N; Ellis C (EDS) pp. 206-213, XP000620968.

Proceedings of the Conference on Emerging Technologies and Applications vol. 1 1996 pp. 60-63. Vetter, RJ; Junalacada, C. "A Multimedia System for Asynchronous Collaboration".

"Interactive Remote Recording and Playback of Multicast Video Conferences" W. Holfelder (1998).

Sastry. Chellury R. et al., "Web Tour: A System to Record and Playback Dynamic Multimedia Annotations on Web Document Control," Proceedings of the International Conference, Oct. 1999 pp. 175-178.

Schulzrinne, H. "RTP Profile for Audio and Video Conferences with Minimal Control," RFC 1890, Jan. 1996, pp. 1-18.

Schulzrinne, H. et al. "Real Time Streaming Protocol (RTSP)," RFC 2326, Apr. 1998, pp. 1-92.

Partridge, C. "A Proposed Flow Specification," RFC 1363, Sep. 1992, pp. 1-20.

Croker, S. "Proposal for a Network Standard Format for a Data Stream to Control Graphics Display," RFC 86, Jan. 5, 1971, pp. 1-6.

* cited by examiner

METHOD AND APPARATUS FOR AUTOMATICALLY DATA STREAMING A MULTIPARTY CONFERENCE SESSION

CROSS-REFERENCE TO RELATED PATENT APPLICATIONS

This patent application is a continuation of U.S. patent application Ser. No. 09/794,002, entitled "Method And Apparatus For Automatically Data Streaming A Multiparty Conference Session," filed Feb. 28, 2001, now U.S. Pat. No. 7,328,239, which claims priority to U.S. Provisional Patent Application Ser. No. 60/186,033, entitled "A Mechanism to Automatically Record and Live-Broadcast/Simulcast a Telephony Conference For Distribution Via Internet Streaming Media," filed Mar. 1, 2000 by Paul Berberian and Todd Vernon, the disclosure of which is incorporated by reference herein, and claims priority to commonly assigned U.S. Provisional Patent Application Ser. No. 60/199,077, entitled "A Mechanism to Automatically Record and Live-Broadcast/Simulcast a Telephony Conference For Distribution Via Internet Streaming Media," filed Apr. 20, 2000 by Paul Berberian and Todd Vernon, the disclosure of which is incorporated by reference herein.

BACKGROUND OF THE INVENTION

This invention relates generally to the streaming of a conference session, and in particular, to a method and apparatus for automatically data streaming a multiparty conference session.

Participants of meetings in a single company, as well as meetings between multiple companies, are typically located at geographically remote locations. Often, expenses associated with the participants' travel to a single site for the meetings prohibit such travel. Teleconferencing provides a convenient, low-cost solution by allowing individuals from various geographic locations to have a meeting over the telephone. Teleconferencing also can be used where the number of participants in a meeting exceeds the available physical meeting space.

Conventional conferencing systems and methods are limited in the number of people that can participate in a conference call. One type of limitation includes expense limitations. Typically, the moderator of a conference call has to pay for each connection. For a conference call with a large number of participants, the cost can become prohibitive.

Another type of limitation is a hardware limitation. Conferencing equipment, such as conference bridges, have a limited number of connections that can be handled. Since each participant in the conference call connects to the conference bridge, a connection line on the conference bridge is needed for each participant.

A proposed solution is to record the conference call and make it available for playback by people who did not listen to the original call. However, the process of recording a call and making the recorded data available for later playback involves manually linking equipment and manually initiating the recording process. Such steps are burdensome and time intensive.

As can be appreciated, conventional conferencing systems are limited in their ability to live broadcast a telephone conference and to record a telephone conference. What is needed therefore is a system for recording and automatically data streaming a telephone conference to participants.

SUMMARY OF THE INVENTION

The present invention addresses the aforementioned needs by providing a system that enables the data streaming of a conference session. In accordance with the present invention, the conferencing system can be configured to include a transcoding platform that records the conference session. The conferencing system can data stream the audio data of a conference call to participants. The conferencing system can also record the conference call and transcode it for subsequent playback. It is a feature of the present invention that the data streaming and the recording of the conference call can be automatically initiated and handled by the conferencing system.

BRIEF DESCRIPTION OF THE DRAWINGS

The foregoing and other features and advantages of the invention will be apparent from the following, more particular description of embodiments of the invention, as illustrated in the accompanying drawings.

DETAILED DESCRIPTION OF THE INVENTION

Several embodiments of the invention are discussed in detail below. While specific implementations are discussed, it should be understood that this is done for illustration purposes only. A person skilled in the relevant art will recognize that other components and configurations may be used without parting from the spirit and scope of the invention.

The terms "conference call," "conference session," and "multiparty conference session" are used interchangeably for any telephone conference call between more than one participant. The term "participant" includes any person who has the ability to talk on a particular conference call or who receives the data stream of a conference call as the call is being conducted. In one embodiment the data stream is an audio stream. One of the participants in the conference call is referred to as a moderator. The moderator can initiate and/or control the conference call.

It can be appreciated that while the description of the invention includes descriptions of different platforms in the conferencing system, one or more of the platforms can be either co-located on a single system or device or located on different devices.

It is a feature of the present invention to provide a system to automatically record and/or broadcast a live telephony conference for distribution. The system enables the live and on-demand play of conferences using streaming media technology. The conference recordation and playback enable persons not able to participate in the original conference call to access and playback the conference call anytime.

Another feature is to automate the starting, ending, and managing of a recording and/or live broadcast of a conference session. Upon a request from a moderator, the conferencing system establishes a link to a transcoding platform and automatically initiates the streaming process. Once the conference is complete, the conferencing system automatically moves the files to an appropriate location and makes them immediately available for playback.

Another feature is to allow listen-only participants to connect to an Internet audio stream of the conference call. A benefit is that the number of participants can be significantly increased without tying up additional conference ports. Typically, few participants in a conference call speak and the majority of the participants listen. By streaming the audio portion of a conference call, many participants can listen to the call while only a single line on the conference bridge is required for those participants.

In one embodiment, the moderator can use a web browser to control the conference. For example, the moderator can view current participants, dial out to new participants, and mute or disconnect participants.

In another embodiment, the moderator may share and control a slide presentation with participants who are using a web browser. Pointers to the actual slides are captured when the conference is recorded.

Figure 1:
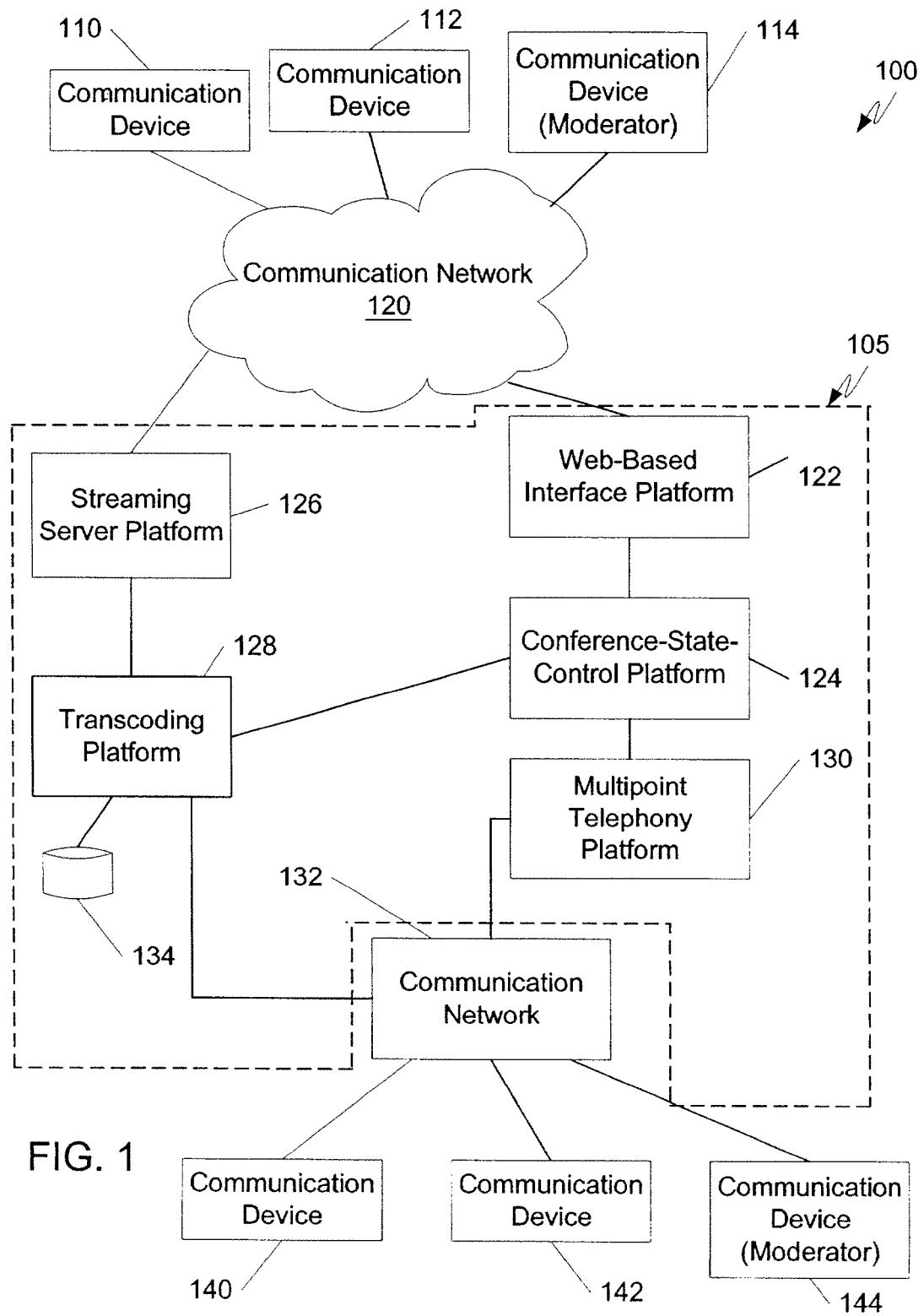
FIG. 1 illustrates a generic multiparty conference streaming system.

An example of a system for generating a data stream of a conference session is illustrated in FIG. 1. The system 100 includes a conferencing system 105 that is coupled to a communication network 120 and a communication network 132.

In the illustrated embodiment, communication network 120 is a packet-switched network, such as the Internet, a local area network (LAN), a wide area network (WAN), or any other private or public network. In a packet-switched network, there is no single, continuous connection between the sender and the receiver. Information is broken into small packets, routed to the receiving end and then reassembled.

In one embodiment, communication network 132 is a packet-switched network. Some examples of suitable packet-switched networks include voice-over internet protocol (IP) networks, voice-over digital subscriber line (DSL) networks, and voice-over asynchronous transfer mechanism (ATM) networks.

In another embodiment, communication network 132 can be a circuit-switched network, such as telephone network. In a circuit-switched network, such as a telephone network, after a connection is made, that part the circuit-switched network is dedicated only to that single connection. Some examples of telephone networks include a public switch telephone network (PSTN), a private branch exchange (PBX), or other private telephone network. In one embodiment, the conferencing system 105 can include communication network 132.

The conferencing system 105 is coupled to a plurality of communication devices 110, 112, 114 via communication network 120. Device 114 is designated as the communication device of the moderator of a conference call.

In one embodiment, communication devices 110, 112, 114 are personal computers. In an alternative embodiment, communication devices 110, 112, 114 can be voice-over IP telephones. It can be appreciated that any number of communication devices can be coupled to the communication network 120.

Communication devices 110, 112, 114 can be used by participants in a conference call to listen to the audio portion of a conference call and to view available images during a conference call. Similarly, the devices can be used to playback a recorded conference call at a time unrelated to the call.

The moderator can upload and share a presentation with conference participants who can access the presentation via the communication network 120, as discussed below. Participants listening to the audio portion of a conference call can send written questions to the moderator over the communication network 120.

The conferencing system 105 is also coupled to a plurality of communication devices 140, 142, 144 via telephone network 132. In one embodiment, communication devices 140, 142, 144 are devices that can be coupled to the telephone network 132, such as telephones, including voice-over IP telephones, personal computers, etc. While three communication devices are illustrated in FIG. 1, any number of communication devices can be coupled to network 132.

A connection between the conferencing system 105 and communication devices 140, 142, 144 is established to allow speaking participation by persons using devices 140, 142, 144. In order to talk on a conference call, a participant needs to be connected to the telephone network 132. It can be appreciated that a single participant can operate concurrently one of the communication devices 110, 112, 114 and one of the communication devices 140, 142, 144.

In the illustrated embodiment, the conferencing system 105 includes an interface platform 122. Interface platform 122 provides an interface for participants in a conference call. In the illustrated embodiment, the interface platform 122 is an Internet-based or web-based user interface. In one embodiment, the interface platform 122 can include one or more servers. For example, different participants can be simultaneously interacting with different servers.

The interface platform 122 performs several functions related to the control and monitoring of the conference call. The interface platform 122 generates a series of related web pages that can be used to set up, initiate, and control a conference call. The particular features of the interface platform 122 for a moderator are discussed in greater detail below in reference to FIG. 2.

The moderator can upload a presentation on the interface platform 122. Participants can view the presentation, as controlled by the moderator, using communication devices 110, 112, 114.

The conferencing system 105 includes a conference-state-control platform 124 that is coupled to the interface platform 122. The conference-state-control platform 124 maintains data for an ongoing conference call. Such data can include the identification of the participants for a call, the particular communication device(s) for each participant, and the status of the communication lines for each participant, such as connected, dialed, muted, disconnected, etc.

In one embodiment, the conference-state-control platform includes a processor running an operating system, a database, and a customized software application. An exemplary processor is available from Sun Microsystems in Palo Alto, Calif. An exemplary operating system is a Sun Solaris Operating System available from Sun Microsystems. In one embodiment, the database is a database that includes a central database and a mirror database. An exemplary database is available from Oracle in Redwood Shores, Calif. In the illustrated embodiment, the mirror database contains information about ongoing calls and the central database contains information about previous conference calls. In one embodiment, the software application is a customized Java-based application.

The conferencing system 105 includes a conference bridge or multipoint telephony platform 130. The multipoint telephony platform 130 is coupled to the conference-state-control platform 124 and to telephone network 132 as illustrated in FIG. 1. For a particular conference call, the multipoint telephony platform 130 accepts multiple telephone calls, mixes the voices on the calls into an audio signal, and forwards the resulting signal to all of the connected lines.

In one embodiment, the multipoint telephony platform 130 includes a conference bridge available from Voyant.

The conferencing system 105 also includes a transcoding platform 128 and a streaming server platform 126. In the illustrated embodiment, the transcoding platform 128 is coupled to the conference-state-control platform 124 and to the telephone network 132. The streaming server platform 126 is coupled to the communication network 120 and to the transcoding platform 128.

The transcoding platform 128 includes a plurality of lines to which a call from the multipoint telephony platform 130 can be connected. In one embodiment, individual participants are connected to the multipoint telephony platform 130 via the telephone network 132. The multipoint telephony platform 130 merges the audio from the participants into a single stream which is forwarded to the transcoding platform 128 as a single call. The transcoding platform 128 can handle multiple conference calls from one or more multipoint telephony platforms concurrently.

Each telephone conference call has audio data associated with the call. The transcoding platform 128 processes the audio data for a call that is connected to one of its lines based on the instructions from the moderator for that call.

In one embodiment, the transcoding platform 128 records audio data received via internet protocol (IP) packets, transcodes the data into a streaming media compatible format that is written to a file and/or sends the digital data stream to the streaming server platform 126.

The moderator can request that a conference call be recorded for later playback. The moderator can also request that a call be data streamed to interested participants.

If the moderator requests recording of the call, the audio data of the call is recorded and saved to a file. Pointers to images and slide-change events that are presented as part of the conference call are also recorded into a time-sequenced streaming file. The transcoding platform 128 initiates a time-sequenced streaming or timing file at the beginning of the conference call. When the moderator changes slides during a conference call, the conference-state-control platform 124 informs the transcoding platform 128 and the servers in the interface platform 122 that a slide change occurred. Upon receiving such notification, the transcoding platform 128 records or marks that point in time in the timing file. The marking identifies the time relative to the start of the call that the slide was presented. The notification also causes the servers in the interface platform 122 to show the next slide in the uploaded presentation.

In the illustrated embodiment, the recorded files are forwarded to storage device 134 in a manner that facilitates the retrieval of the file. The recording and playback operations are discussed in greater detail below.

If the moderator requests streaming of the audio portion of a conference call, the transcoding platform 128 sends an encoded digital data stream to a streaming server platform 126. The streaming server platform 126 sends the data stream to the communication network 120. Some examples of a streaming server are a Microsoft Windows Media Server and a Real Networks Server.

Participants can access the data stream utilizing a communication device 110, 112, 114 and communication network 120. It can be appreciated that the audio stream may be listened to utilizing any streaming media player. For example, participants can use the Real Player M media player available from Real Networks.

Figure 6:
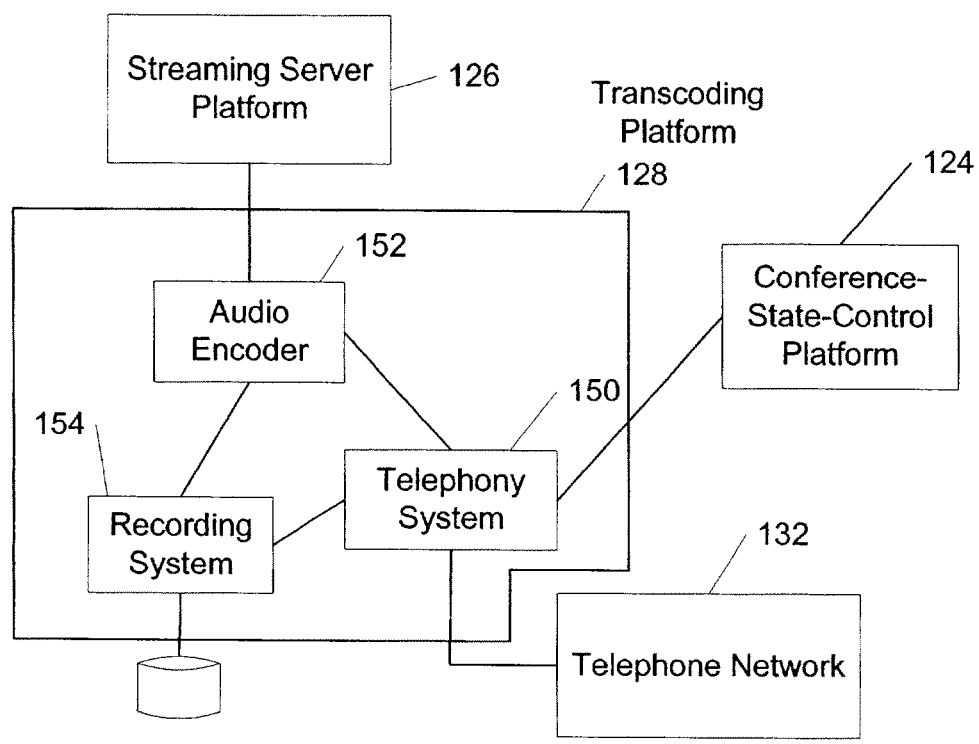
FIG. 6 illustrates an embodiment of a transcoding platform according to the invention.

One embodiment of the transcoding platform 128 is illustrated in FIG. 6. In the illustrated embodiment, the transcoding platform 128 includes a telephony system 150, an audio encoder 152, and a recording system 154. While only one of the telephony system 150, audio encoder 152, and recording system 154 are illustrated, the transcoding platform 128 can include a plurality of each of these devices. For example, the transcoding platform 128 can include a plurality of audio encoders, each of which can encode a data stream or streams into different formats.

In one embodiment, the transcoding platform includes a set of processors or computers that are connected in a network arrangement, such as a LAN, via high speed Ethernet connections. The transcoding platform is also referred to as a media gateway.

In one embodiment, the telephony system includes a telephony interface and processor card connected to the expansion bus of a computer, the software drivers and libraries associated with the card, and customized software. In one embodiment, the connection between the telephone interface card and the communication network 132 is a standard "T-1" line with multiple associated line numbers. Some exemplary interface cards are available from Brooktrout in Needham, Mass. and Dialogic in Parsippany, N.J.

In one embodiment, the audio encoder includes a server or servers operating one or more custom software applications that include encoder software library functions from Real Networks. Each application transcodes incoming audio data packets and sends them to a Real Networks server. Some examples of an audio encoder are a Microsoft Windows Media Encoder and a Real Networks Encoder.

In one embodiment, the recording system includes a customized software application and a merging utility application from Real Networks to generate a combined multimedia archive file suitable for streaming by a Real Networks server.

As previously discussed, the moderator of a conference call can control the call. The interface platform 122 provides several windows and web pages that enable the moderator to control the call. For example, the interface platform 122 can include a page or interface that allows a moderator to upload a presentation, such as a slide presentation, for a call. Once the presentation is uploaded, the moderator can scroll forward or backward through the presentation at any desired speed.

Figure 2:
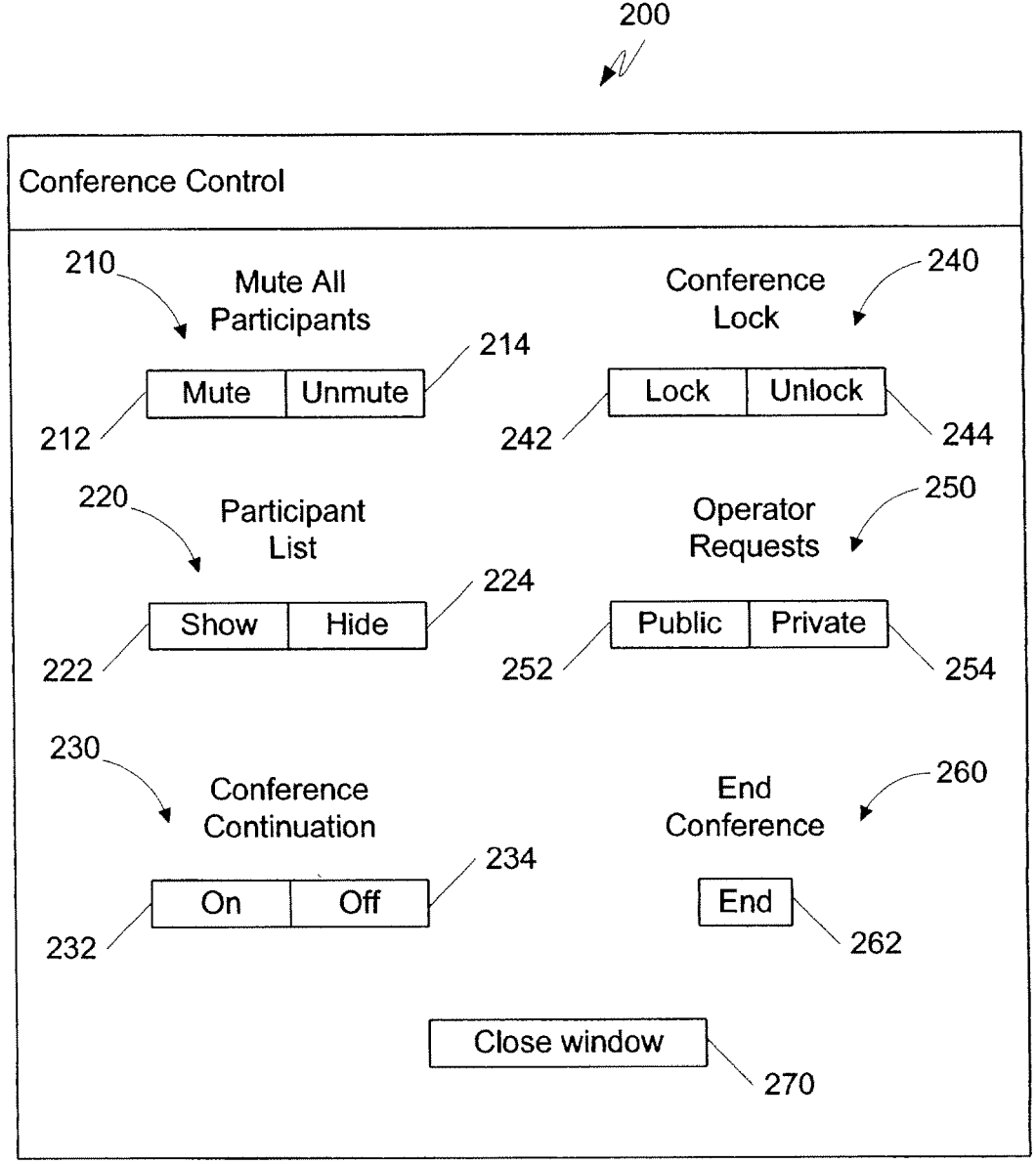
FIG. 2 illustrates a user interface window of the conference streaming system of FIG. 1.

The interface platform 122 also includes a call control window. An embodiment of a call control window is illustrated in FIG. 2. The control window 200 is an interactive window with which a moderator can interact utilizing a mouse, keyboard, or other control device.

The control window 200 includes several areas relevant to the control of a call. The window 200 includes a mute all participants area 210. The moderator can select between a mute button 212 and an unmute button 214. If the mute button 212 is selected, only the moderator can be heard on the call. In one embodiment, the moderator can selectively mute a particular participant on the interface 122. For example, a participant can be muted if he or she is on a bad or noisy connection line.

The window 200 includes a participant list section 220. The moderator can determine whether the participants in the conference call can view a list of all of the participants. The moderator can select a show button 222 or a hide button 224.

The conference continuation area 230 allows the moderator to determine whether participants can continue the conference after the moderator has disconnected. The moderator can select the on or off buttons 232, 234.

The window 200 includes a conference lock area 240. The moderator can decide to lock the conference and prevent new participants from joining by selecting lock button 242. Alternatively, button 244 unlocks the conference.

Sometimes the moderator of a conference call may want to speak with the operator associated with the conference call. The window 200 includes an operator requests area 250. If the moderator selects a public button 252, the operation joins the conference as a participant and can listen and respond to the moderator's request. If the moderator selects a private button 254, an operator establishes a private conference with the moderator.

The moderator can end the conference by selecting the end button 262 in the end conference area 260. The moderator control window 200 can be closed by selecting the close window button 270.

Figure 3A:
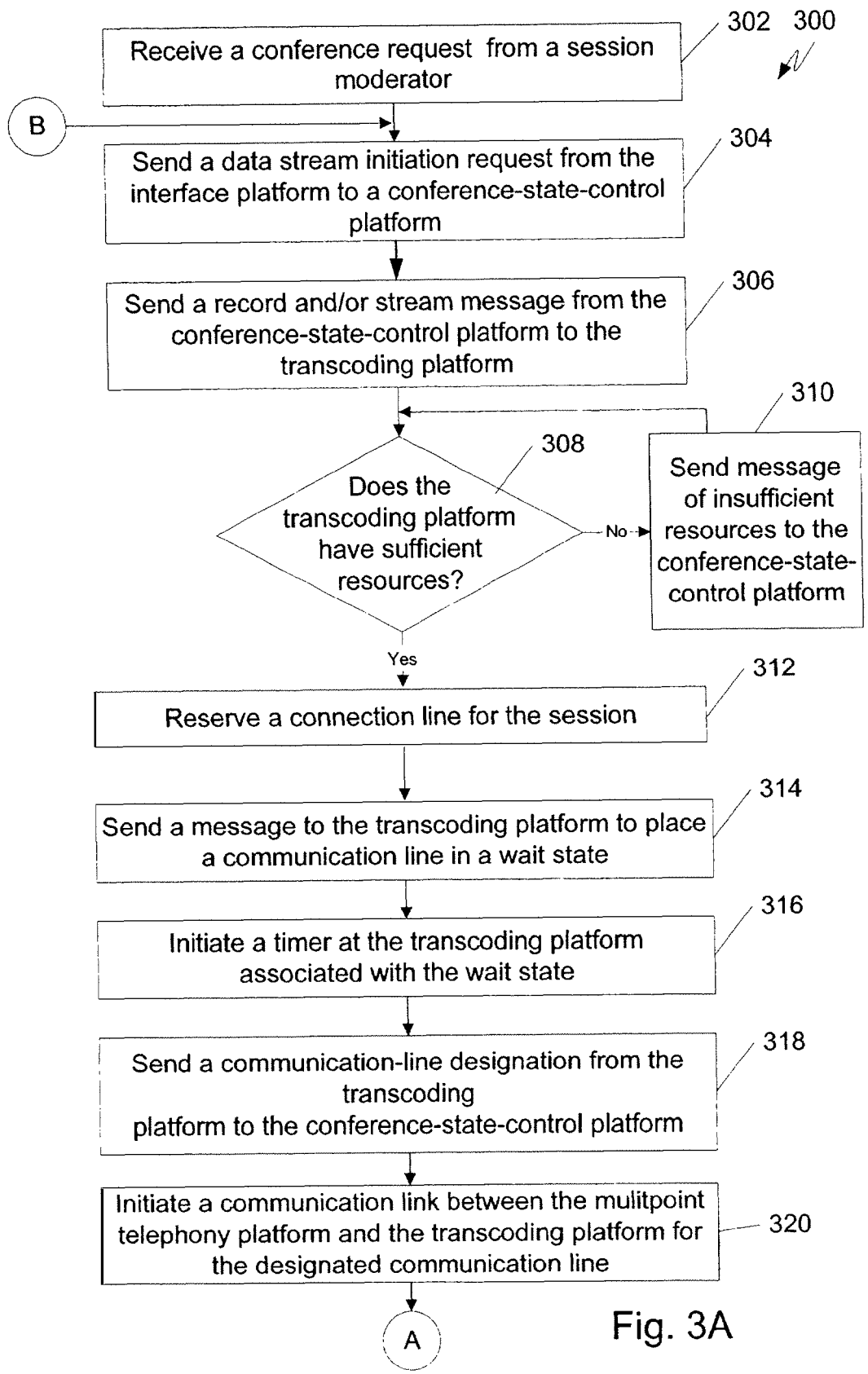
FIGS. 3A-3B, 4A-4B, and 5 are flowcharts of the operation of a multiparty conference streaming system.
Figure 3B:
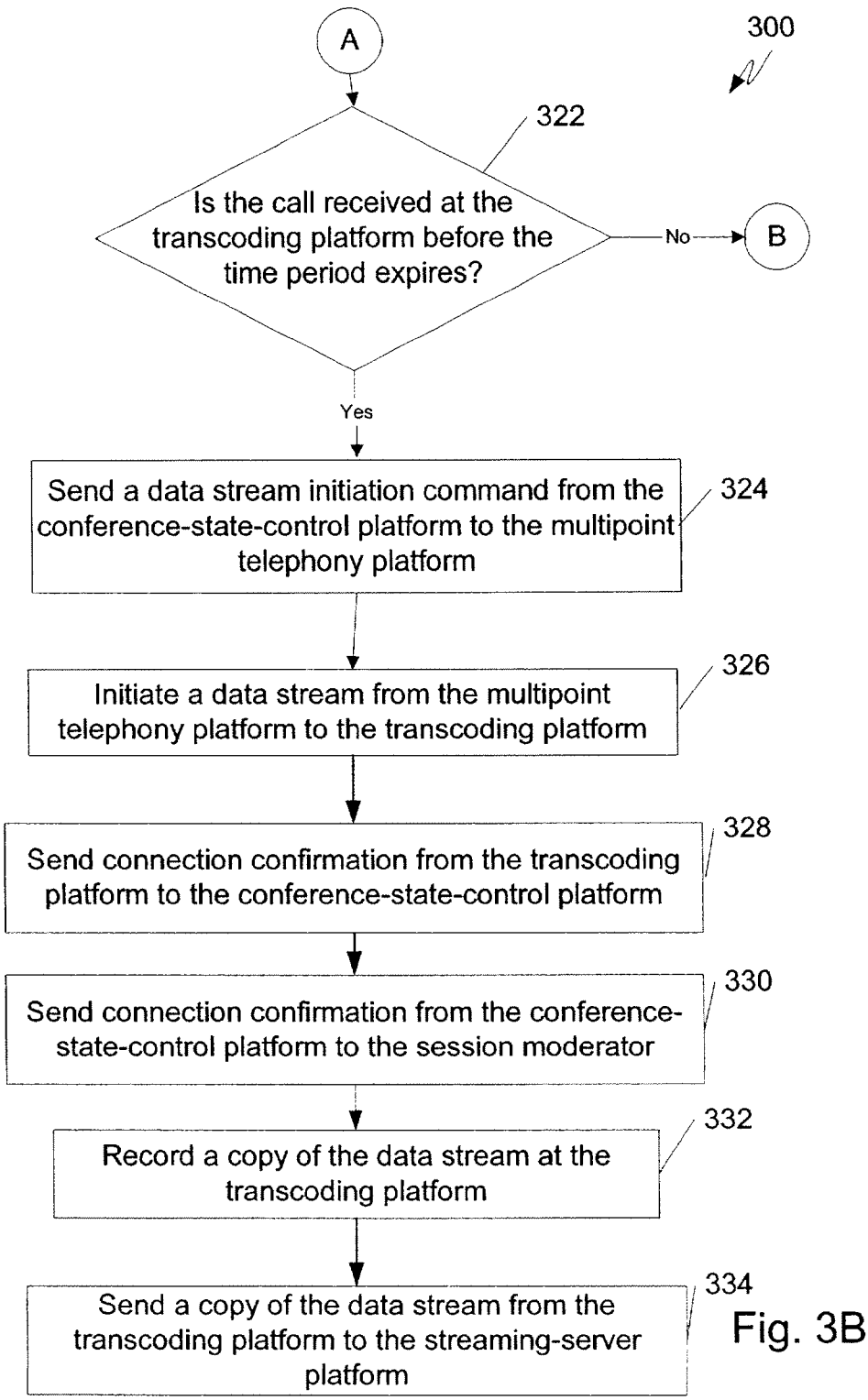

The operation of the conferencing system 105 is now described. FIGS. 3A-3B illustrate a flowchart 300 of the data streaming process for a conference call. Flowchart 300 illustrates the steps that are performed in the establishing of a data stream for a conference session.

At step 302, a conference moderator views a conference control page on a communication device 114, such as a computer, with a web browser. The control page is dynamically generated and updated by the web-based interface platform 122.

The control page includes control elements such as buttons that allow the moderator to initiate a streaming or recording of the conference. For example, the control page includes a record button and a stream button. The selection of either or both record and stream buttons causes the web browser to send a message to the interface platform 122.

At step 304, after receiving the moderator's request, the interface platform 122 sends a message to the conference-state-control platform 124. The content of the message is determined by the button or buttons selected. This message is referred to as a data stream initiation request because the moderator has requested to record and/or data stream the conference call, each of which requires the establishment of a data stream.

At step 306, the conference-state-control platform 124 sends a message to the transcoding platform 128. In one embodiment, the message is in the format of a transmission control protocol (TCP)/IP message. The message to the transcoding platform 128 includes information relating to the moderator's selections for the particular conference call. For example, if the moderator selected recordation of the call, the message includes instructions to record the call. Similarly, if streaming is requested, the message includes streaming instructions. In the illustrated embodiment, the moderator can decide to start and stop recording and streaming at any point during the conference call.

In one embodiment, the conference-state-control platform 124 contacts the telephony system 150 which maintains a pool of telephone numbers associated with telephone lines connected to it. The conference-state-control platform 124 sends certain identifying information about the conference to the telephony system 150.

At step 308, the transcoding platform 128 receives the message from the conference-state-control platform 124 and performs a resource verification. A resource verification is a check that the transcoding platform 128 has sufficient available incoming lines or resources on which to receive and process the call.

If the transcoding platform 128 does not have sufficient resources, then the process continues to step 310. At step 310, the transcoding platform 128 sends a message to the conference-state-control platform 124 that insufficient resources are available. The conference call will continue but audio streaming will not be available.

In one embodiment, the process returns to step 308 and repeats itself. The resource verification loop can repeat itself for a predetermined amount of time or a predetermined number of times, until the conference-state-control platform 124 informs the moderator to retry the call later.

In another embodiment, the conference-state-control platform 124 can contact a different transcoding platform 128 for the conference call.

If the transcoding platform 128 has sufficient resources, the transcoding platform 128 reserves one of its associated connection lines and returns the connection-line designation to the conference-state-control platform 124. Then the process continues to step 312.

At step 312, the transcoding platform 128 reserves a connection line for the conference session.

At step 314, the conference-state-control platform 124 sends a message to the transcoding platform 128 relating to a conference call. The message includes information relating to the recording and/or streaming of the call.

At step 316, once a line at the transcoding platform 128 is placed into a "wait" state, a timer at the transcoding platform 128 is started. The timer is set for a predetermined time period to control how long the line remains in its "wait" state. For example, the timer may be set for thirty seconds. Once the predetermined amount of time has passed, the line is released and made available if the call is not received.

At step 318, a communication-line designation is forwarded from the transcoding platform 128 to the conference-state-control platform 124. The communication-line designation includes information identifying the particular line that has been reserved for the conference call. The communication-line designation is generated by the transcoding platform 128. In one embodiment, the communication-line designation is a telephone number.

At step 320, a communication link is initiated between the multipoint telephony platform 130 and the transcoding platform 128. The link is initiated by messages from the conference-state-control platform 124. A message includes the communication-line designation so that the multipoint telephony platform 130 and the transcoding platform 128 know which line to use for the call.

At step 322, the transcoding platform 128 determines whether it has received the call before the predetermined time period expires. By using the timer to limit the amount of time that a line is reserved for a particular call, the resources of the transcoding platform 128 are more efficiently used. Similarly, the use of the timer also aids in recovering from network call failure.

If the call is not received before the expiration of the time period, the call is not connected to the transcoding platform 128 and the process returns to step 304. If the call is received before the expiration of the time period, then the process continues to step 324.

At step 324, the conference-state-control platform 124 sends a data stream initiation command to the multipoint telephony platform 130. The command instructs the multipoint telephony platform 130 to add one or more participants by dialing the designated number or numbers, thereby establishing a telephone connection.

At step 326, the conference-state-control platform 124 immediately initiates a data stream from the multipoint telephony platform 130 to the transcoding platform 128. As discussed above, the multipoint telephony platform 130 and the transcoding platform 128 are connected via the telephone network 132. In one embodiment, the data stream is a TCP/IP data stream containing sound data.

In the illustrated embodiment, the data stream initiation command includes instructions to dial out from a line connected to the multipoint telephony platform 130 and into the transcoding platform 128. Accordingly, a connection between the multipoint telephony platform 130 and the transcoding platform 128 is established via the telephone network 132. Once the two are successfully linked, a voice path exists between them for the duration of the conference, or until the connection is closed.

In one embodiment, the connection is established by dialing a number in the PSTN, using one telephone line from the multipoint telephony platform 130, and another telephone line from the telephony system 150 through the telephone network 132.

It can be appreciated that the connection can be established by the multipoint telephony platform 130 dialing the transcoding platform 128 or by the transcoding platform 128 dialing the multipoint telephony platform 130.

At step 328, a confirmation that the connection between the multipoint telephony platform 130 and the transcoding platform 128 for the multiparty conference session has been established is forwarded to the conference-state-control platform 124. The successful linkage is communicated to the conference-state-control platform 124 via a TCP/IP message.

At step 330, the successful connection is communicated from the conference-state-control platform 124 to the interface platform 122, and subsequently, the session moderator. The connection can be reflected in an update on the interface platform 122. The update can be any type of indicator, such as audio, visual, etc.

At step 332, a copy of the data stream of the conference call is recorded at the transcoding platform 128. The successful linkage between the multipoint telephony platform 130 initiates a recording process on the transcoding platform 128. The contents of the voice channel are recorded in a digital format for the duration of the session. The recording continues until the multipoint telephony platform 130 is disconnected from the transcoding platform 128. In FIG. 1, the recording process is performed by the telephony system 150 of the transcoding platform 128.

At step 334, if the moderator requested streaming of the conference call, a copy of the recorded data stream is continuously forwarded from the transcoding platform 128 to the streaming server platform 126 during the call. The recorded data stream is encoded for playback by a media player. It can be appreciated that there may be a minimal delay between the audio of the conference call and the presentation of the audio via a media player due to the encoding and network transport of the audio packets. The streaming of the audio data of a call is discussed in greater detail below.

Figure 4A:
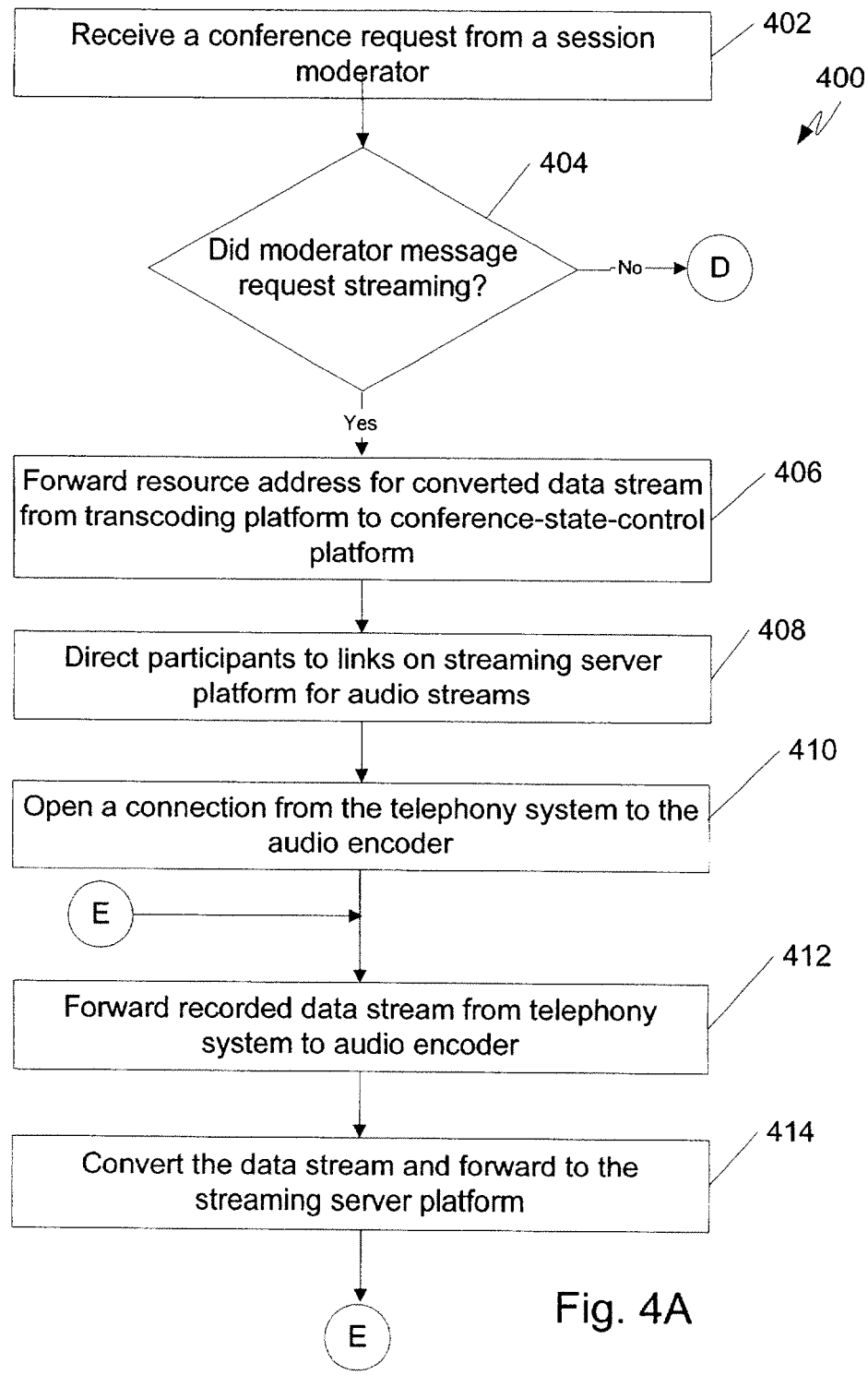
Figure 4B:
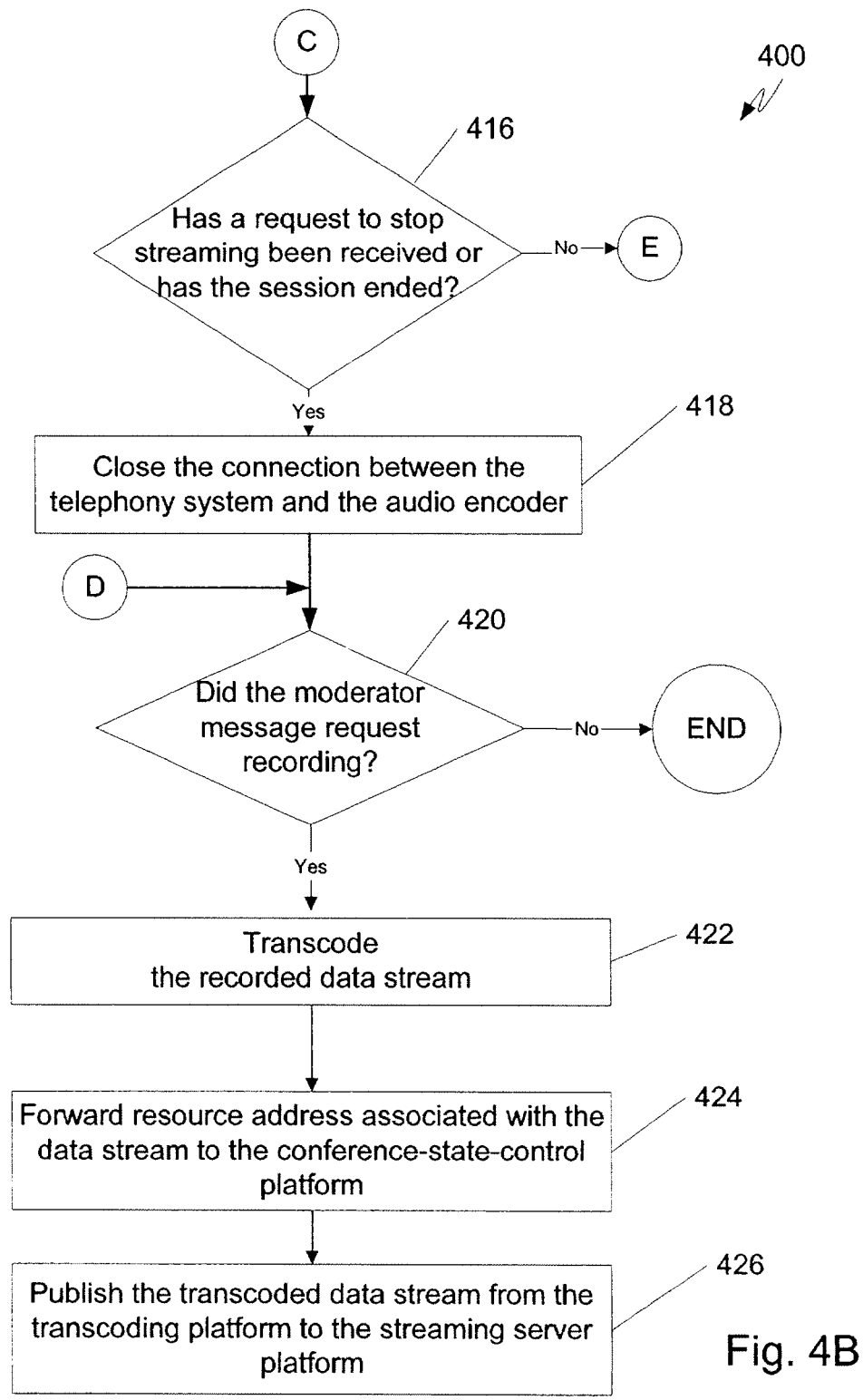

FIGS. 4A-4B illustrate a flowchart 400 that includes steps performed in the recording and streaming of data stream for a conference session.

At step 402, the moderator makes a conference request via interface platform 122. The conference request includes information as to whether the moderator wants the conference call recorded and/or streamed. The interface platform 122 receives the conference request and forwards the request to the conference-state-control platform 124.

At step 404, the conference-state-control platform 124 determines whether the moderator requested streaming of the conference session. If the moderator did not request streaming, then the process skips to step 420. If the moderator requested streaming, the process continues to step 406.

At step 406, the transcoding platform 128 forwards the resource address to the conference-state-control platform 124. The conference-state-control platform 124 maintains a record of the resource addresses that are associated with ongoing conference calls. The resource address is forwarded to the interface platform 122 and is made available to the public via the communication network 120.

At step 408, participants can access the audio stream of a particular conference call via the streaming server platform 126. The participants are directed to links on the streaming server platform 126 using the resource address from the conference-state-control platform. Any person who can play the transcoded audio stream can become a participant in the conference call.

At step 410, the telephony system 150 opens a connection to the audio encoder 152. At this point, data can be forwarded over this connection.

At step 412, the recorded data stream from the conference call is forwarded from the telephony system 150 to the audio encoder 152.

At step 414, the audio encoder 152 converts the audio data stream into a format that is suitable for distribution to communication devices that are coupled to the computer network 120. In the illustrated embodiment, the data stream is transcoded into an Internet-playback format. It can be appreciated that the data stream can be transcoded into any playback format, including synchronized multimedia integration language (SMIL) from W3C.

The audio encoder 152 forwards the transcoded audio data stream to the streaming server platform 126. The transcoded data stream file is stored on the streaming server platform 126 in a manner that facilitates the subsequent retrieval of the file. The storage location of the file is identified and a resource address, such as a uniform resource locator (URL), is generated for retrieval of the file. The resource locator for a file can be referred to as a "ticket." The "ticket" can be used to retrieve the file or files relating to a particular conference session.

At step 416, the conference-state-control platform 124 determines if the conference session has ended or if a request to stop streaming the conference session has been received. As discussed above, the moderator can request that the streaming of a conference be stopped at any time.

If the session has not ended and no stop request received, then the process returns to step 412. It can be appreciated that steps 412 and 414 are continuously performed during a conference session. If either the session has ended or a stop request received, then the process continues with step 418.

At step 418, the connection between the telephony system 150 and the audio encoder 152 is closed. At this point, the data stream is stopped.

At step 420, the conference-state-control platform 124 determines whether the moderator requested recording of the conference call. If the moderator did not request recording, then the process ends. If the moderator requested recording, the process continues to step 422.

At step 422, upon the disconnection of the multipoint telephony platform 130 from the transcoding platform, the transcoding platform 128 automatically begins the process of transcoding the recorded data into a streaming media format. In the illustrated embodiment, the transcoded data format is selected for playback using a media player, such as Real Player from Real Networks.

At step 424, after the transcoding is completed, a resource address associated with the data stream is forwarded to the conference-state-control platform 124.

At step 426, the transcoded data stream is published to one or more streaming server platforms 126 for later playback using a media player. The resource address is made available via the interface platform 122 for the subsequent playback of a call.

In one embodiment, the moderator can request the resource address or ticket of a recorded conference call. For example, the moderator may want to forward the address to the participants in the call so they can review or make reference back to the call. In the illustrated embodiment, the conferencing system 105 can send the resource address to the moderator in response to the moderator's request. For example, the ticket can be sent by email to the moderator.

In another embodiment, the resource address is published on the interface platform 122 and is available to the general public.

A user, via a communication device 110, 112, selects a resource address associated with a particular conference call that the user would like to playback. The user makes a fetch request for the relevant conference call. The term "fetch request" includes any action taken by a user to select an item. Some examples of fetch requests include clicking on a resource address, clicking on a button on an interface, etc. The conferencing system 105 receives a fetch request from the user and determines the relevant file or files that the user wants.

The streaming server platform 128 distributes the associated transcoded data stream to the user. At this point, the transcoding platform 128 marks the communication line available to allow a new call to be received on that line.

Figure 5:
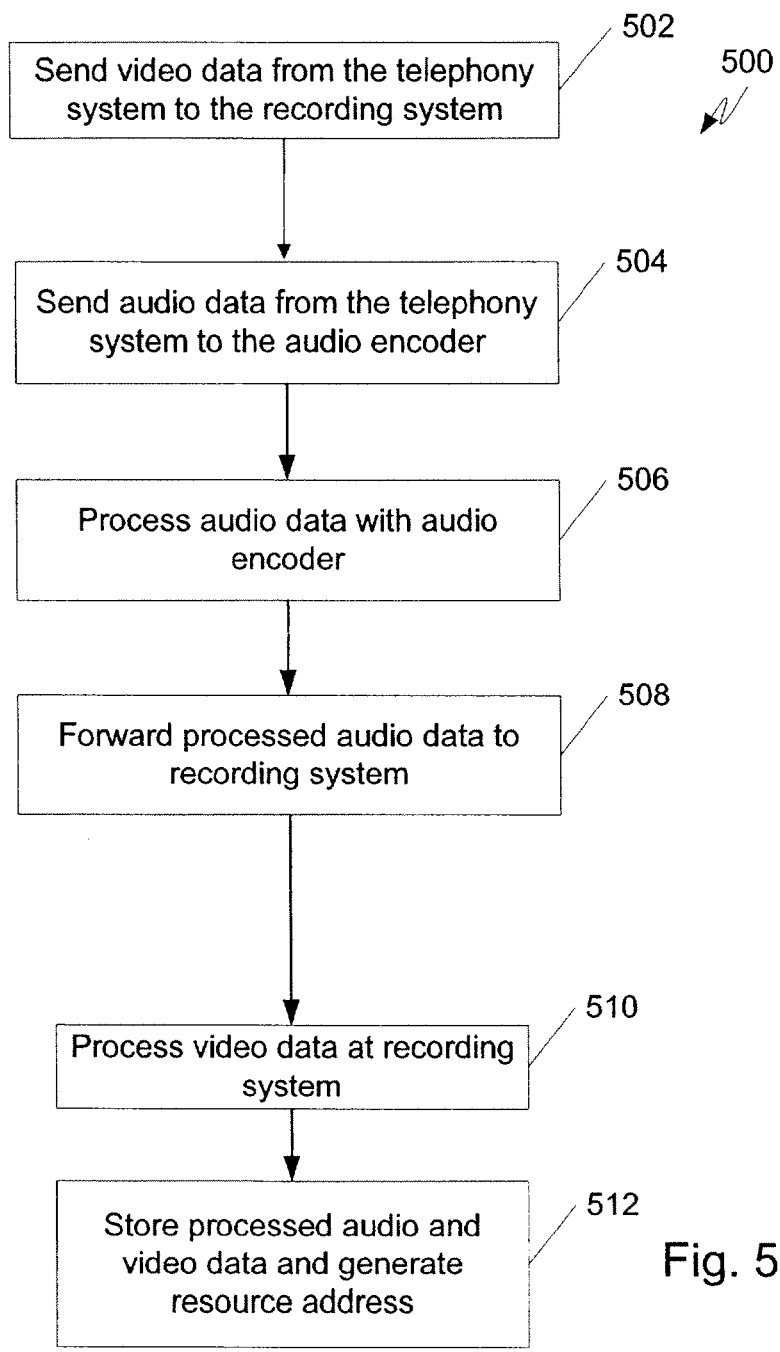

FIG. 5 illustrates a flowchart 500 of a data streaming process that includes steps performed in the transcoding of the data of a conference call for later playback.

In the illustrated embodiment, the data of a conference call can include audio data and video control data. One example of video control data is presentation slides that are used by the moderator during a call. While the slides may be static and under the control of the moderator, the timing of the slides can be recorded so that the slides can be viewed at the same time during the conference call as they actually were shown. In one embodiment, the audio data and pointers or references to images and slide change events are recorded into a time-sequenced streaming file. In another embodiment, they are recorded separately and merged after the conference call. It can be appreciated that the merging can performed in real time as well.

At step 502, the telephony system 150 forwards video control data to the recording system 154. In the illustrated embodiment, the video control data includes a timing file that includes resource addresses that point to particular slides and the time that they were displayed during the conference session.

At step 504, the telephony system 150 forwards audio data from the conference session to the audio encoder 152.

At step 506, the audio encoder 152 processes the audio data into a predetermined media format.

At step 508, the audio encoder 152 forwards the processed audio data to the recording system 154.

At this point, the audio data has been processed. At step 510, the recording system 154 processes the video control data from the conference session. It can be appreciated that the video control data can be processed substantially simultaneously with the processing of the audio data. In one embodiment, the video control data (the timing file) and the audio data can be transcoded and merged into a single file. In another embodiment, the video control data and the audio data can be transcoded and retained in separate files.

At step 512, the recording system 154 stores the processed audio and video control data in the storage device 134. A resource address is generated to facilitate the later playback of the conference session.

In an alternative embodiment, the telephony system 150 can forward audio data from the conference session to the recording system 154. The recording system 154 can process the audio data into a predetermined media format that can be played back using a media player. The recording system then stores the processed files.

In an alternative embodiment, the components of the conferencing system 105 can reside on a single device.

While the invention has been described in detail and with reference to specific embodiments thereof, it will be apparent to one skilled in the art that various changes and modifications can be made therein without departing from the spirit and scope thereof. Thus, it is intended that the present invention covers the modifications and variations of this invention provided they come within the scope of the appended claims and their equivalents.

What is claimed is:

1. A method for automatically data streaming a multiparty conference session, comprising:
   receiving an Internet-based interface at a session moderator, said Internet-based interface configured for said session moderator to enter a request for data streaming a multiparty conference session;
   determining whether sufficient incoming lines are available to accommodate the conference session;
   reserving at least one connection line for the conference session;
   automatically establishing a data stream of said conference session without any human intervention, wherein establishing said automated data stream includes:
   recording the multiparty conference session;
   data streaming the multiparty conference session to the listen-only participants thereby enabling listen-only participants to connect to the multiparty conference session without using additional conference ports and/or conference resources; and
   maintaining data for the ongoing conference session, the data comprising at least one of an identification of the listen-only participants, a communication device for each of the listen-only participants, and a status of the at least one connection line for each of the listen-only participants.

2. The method of claim 1, further comprising: automatically transcoding the recorded data stream at a time unrelated to the multiparty conference session into an Internet-playback format.

3. The method of claim 1, further comprising: creating an address to identify where the data stream of the multiparty conference session is accessible; and providing said address to said session moderator and other participants of the conference session.

4. The method of claim 1, further comprising: receiving a fetch request from a user for the data stream of the multiparty conference session, the fetch request at least identifying said multiparty conference session; and distributing the data stream via the Internet to the user based on the fetch request.

5. The method of claim 1, wherein said automated data streaming process comprises:
   sending a communication interface designation from a transcoding platform to a conference-state-control platform;
   reserving a communication interface associated with the communication interface designation from the pool of communication interfaces; and
   creating a connection for communication, between the communication interface associated with the communication interface designation and a multipoint telephony platform.

6. The method of claim 5, wherein the creating a connection includes initiating a connection to the transcoding platform using the communication interface associated with the communication interface designation.

7. The method of claim 1, wherein said automated data streaming process proceeds as follows:

sending an initiation request from a conference-state-control platform to a transcoding platform;

initiating, from the conference-state-control platform to a multipoint telephony platform, a data-stream start command; and sending the data stream associated with the multiparty conference session from the multipoint telephony platform to the transcoding platform based on the data-stream start command, wherein the data stream includes voice and non-voice data stream.

8. The method of claim 1, wherein said data stream has voice content only.

9. An apparatus, comprising:
a receiver configured to receive a data-stream-initiation request from a session moderator for data streaming a multiparty conference session; and
a processor configured to process, in response to the data-stream-initiation request, a data stream associated with the multiparty conference session responsive to the data-stream-initiation request received, determine whether sufficient incoming lines are available to accommodate the conference session, and reserve at least one connection line for the conference session;
a memory configured to record the multiparty conference session; and
a transmitter configured to stream the multiparty conference session to listen-only participants to enable the listen-only participants to connect to the multiparty conference session without using additional conference ports and/or conference resources, and maintain data for the ongoing conference session, the data comprising at least one of an identification of the listen-only participants, a communication device for each of the listen-only participants, and a status of the at least one connection line for each of the listen-only participants.

10. The apparatus of claim 9, wherein the processor is configured to automatically transcode the recorded data stream at a time unrelated to the multiparty conference session into an Internet-playback format.

11. The apparatus of claim 9, wherein the processor is configured to create an address to identify where the data stream is accessible, and provide the address to the session moderator or other participants of the conference session.

12. The apparatus of claim 9, wherein the
processor is further configured to obtain a communication-line designation, reserve a communication line associated with the communication-line designation from a pool of communication lines, and initiate a connection from the communication line associated with the communication-line designation to a multipoint telephony platform.

13. The apparatus of claim 9, wherein
the transmitter is further configured to transmit an initiation request from a conference-state-control platform to a transcoding platform initiate, from the conference-state-control platform to a multipoint telephony platform, a data-stream start command, and transmit the data stream associated with the multiparty conference session from the multipoint telephony platform to the transcoding platform based on the data-stream start command.

14. A non-transitory computer readable storage medium having instructions stored thereon, the instructions when executed by a processor cause the processor to:
receive a data-stream-initiation request from a session moderator for data streaming a multiparty conference session;
determine whether sufficient incoming lines are available to accommodate the conference session, and reserve at least one connection line for the conference session;
reserve at least one connection line for the conference session;
establish, in response to the data-stream-initiation request, a data stream associated with the multiparty conference session the data streaming without human intervention, wherein establishing said automated data stream includes:
recording the multiparty conference session;
data streaming the multiparty conference session to listen-only participants thereby enabling listen-only participants to connect to the multiparty conference session without using additional conference resources; and
maintaining data for the ongoing conference session, the data comprising at least one of an identification of the listen-only participants, a communication device for each of the listen-only participants, and a status of the at least one connection line for each of the listen-only participants.

15. The non-transitory computer readable storage medium of claim 14, having instructions stored thereon, the additional instructions when executed causes the processor to: automatically transcode the recorded data stream at a time unrelated to the multiparty conference session into an Internet-playback format.

16. The non-transitory computer readable storage medium of claim 14, having instructions stored thereon, the additional instructions when executed causes the processor to:
create a resource identifier that uniquely identifies the data stream of the multiparty conference session; and
deliver the data stream to a user, upon a data stream request received from the user, said data stream request containing at least the resource identifier.

17. The non-transitory computer readable storage medium of claim 14, wherein the instruction to establish the data stream associated with the multiparty conference session includes the following additional instructions that when executed causes the processor to:
select a communication interface from a pool of communication interfaces, each of the pool of communication interfaces corresponding to a communication interface designation;
send the communication interface designation corresponding to the selected communication interface from the virtual participant to a conference-state-control platform, the virtual participant reserving the communication interface associated with the communication interface designation; and
initiate a connection between the communication interface associated with the communication interface designation and a multipoint telephony platform.

18. The non-transitory computer readable storage medium of claim 14, wherein the instruction to establish the data stream associated with the multiparty conference session includes the following additional instructions that when executed causes the processor to:
send an initiation request from a conference-state-control platform to the virtual participant, the virtual participant being a transcoding platform; initiate, from the conference-state-control platform to a multipoint telephony platform, a data-stream start command; and
send the data stream associated with the multiparty conference session from the multipoint telephony platform to the transcoding platform based on the data-stream start command.

19. A method for automatically data streaming a multiparty conference session, comprising:
receiving a data-stream request from an Internet-based interface associated with a session moderator;
determining whether sufficient incoming lines are available to accommodate the conference session;
reserving at least one connection line for the conference session;
establishing the data-stream request received;
automatically data streaming the multiparty conference session based on the received data-stream request;
automatically transcoding the data-streamed conference session to conference session participants via the command by a conference-state-control-platform; and
maintaining data for the ongoing conference session, the data comprising at least one of an identification of the listen-only participants, a communication device for each of the listen-only participants, and a status of the at least one connection line for each of the listen-only participants.

20. The method of claim 19, further comprising: recording the data stream associated with the multiparty conference session upon receiving a record request from the session moderator; and the automatic transcoding of the recorded data stream being performed such that the recorded data stream is transcoded into an Internet-playback format.

21. The method of claim 19, further comprising: creating a resource identifier that uniquely identifies the data stream of the multiparty conference session; and delivering the data stream to a user, upon a data stream request received from the user, said data stream request containing at least the resource identifier.

22. The method of claim 19, further comprising receiving a plurality of data-stream requests from the Internet-based interface.

23. The method of claim 19, wherein the automatic data streaming proceeds as follows: sending a communication line designation from a transcoding platform to a conference-state-control platform, the conference-state-control platform reserving a communication line associated with the communication-line designation from a pool of communication lines; and initiating a connection from the communication line associated with the communication-line designation to a multipoint telephony platform.

24. The method of claim 19, wherein the automatic data streaming proceeds as follows: sending an initiation request from a conference-state-control platform to a transcoding platform; initiating, from the conference-state-control platform to a multipoint telephony platform, a data-stream start command; and sending the data stream associated with the multiparty conference session from the multipoint telephony platform to the transcoding platform based on the data-stream start command.

25. The method of claim 19, wherein the data stream associated with the multiparty conference session has voice content only.

26. An apparatus, comprising:
a transcoding platform that includes a telephony platform, an audio encoder and a recording platform; and
a conference-state-control platform coupled to the transcoding platform, the conference-state-control platform automatically establishing a data stream associated with a multiparty conference session utilizing the transcoding platform, the transcoding platform determining whether sufficient incoming lines are available to accommodate the conference session, reserving at least one connection line for the conference session, recording the data stream associated with the multiparty conference session, the transcoding platform automatically transcoding the data stream associated with the multiparty conference session, wherein the data stream is automatically streamed to multiparty conference session participant's communication devices including, via a direct-line audio connection, to listen-only participants, and wherein the conference-state-control platform is further configured to maintain data for the ongoing conference session, the data comprising at least one of an identification of listen-only participants, a communication device for each of the listen-only participants, and a status of the at least one connection line for each of the listen-only participants.

27. The apparatus of claim 26, wherein the data stream associated with the multiparty conference session is recorded into an Internet-playback format.

28. The apparatus of claim 26, wherein: the conference-state-control platform sends an address request from a session moderator to the transcoding platform, the address request identifying at least said conference session; the conference-state-control platform pushes a resource address associated with the conference session to the session moderator; the transcoding platform receives a fetch request from a user, said fetch request including the resource address; and the transcoding platform distributes the data stream associated with said conference session via the Internet to the user based on the received fetch request.

29. The apparatus of claim 26, wherein the conference-state-control platform establishes the data stream associated with the multiparty conference session by the following: sending an initiation request from the conference-state-control platform to the transcoding platform; initiating, from the conference-state-control platform a data-stream start command; and sending the data stream associated with the multiparty conference session to the transcoding platform based on the data-stream start command.

30. An apparatus, comprising:
a transcoding platform that includes a telephony platform, an audio encoder and a recording platform, configured to be coupled to a telephone network and a pack-switched communication network via a streaming server platform; and
a conference-state-control platform coupled to the transcoding platform, the conference-state-control platform determining whether sufficient incoming lines are available to accommodate the conference session, reserving at least one connection line for the conference session, automatically establishing a data stream associated with a multiparty conference session utilizing the transcoding platform, the transcoding platform recording the data stream associated with the multiparty conference session, wherein the data stream is automatically streamed to multiparty conference session participants' communication devices including, via a direct-line audio connection, to listen-only participants, and wherein the conference-state-control platform is further configured to maintain data for the ongoing conference session, the data comprising at least one of an identification of listen-only participants, a communication device for each of the listen-only participants, and a status of the at least one connection line for each of the listen-only participants.

31. The apparatus of claim 30, wherein the data stream associated with the multiparty conference session is recorded into an Internet-playback format.

32. The apparatus of claim 30, wherein: the conference-state-control platform sends an address request from a session moderator to the transcoding platform, the address request identifying at least said conference session; the conference-state-control platform pushes a resource address associated with the conference session to the session moderator; the transcoding platform receiving a fetch request from a user based on the resource address; and the transcoding platform distributing the data stream via the Internet to the user based on the received fetch request.

33. The apparatus of claim 30, wherein the conference-state-control platform establishes the data stream associated with the multiparty conference session by the following: sending an initiation request from the conference-state-control platform to the transcoding platform; initiating, from the conference-state-control platform, a data-stream start command; and sending the data stream associated with the multiparty conference session to the transcoding platform based on the data-stream start command.

34. A method for automatically data streaming a multiparty conference session, comprising:
receiving an initiation request at a transcoding platform via a conference state control platform commanding the transcoding platform to initiate the data streaming;
determining whether sufficient incoming lines are available to accommodate the conference session;
reserving at least one connection line for the conference session;
transmitting a data stream associated with the multiparty conference session from a multipoint telephony platform to the transcoding platform;
providing said data stream associated with the multiparty conference session to one or more users, wherein, none of the above steps require any human intervention, wherein the data stream is automatically streamed to multiparty conference session participant's communication devices including, via a direct-line audio connection, to listen-only participants; and
maintaining data for the ongoing conference session, the data comprising at least one of an identification of the listen-only participants, a communication device for each of the listen-only participants, and a status of the at least one connection line for each of the listen-only participants.

35. The method of claim 34, further comprising: receiving a connection confirmation indicating that a connection associated with the multiparty conference session has been established between the multipoint telephony platform and the transcoding platform.

36. A method for initiating a multiparty conference session, comprising:
receiving a conference request from a session moderator associated with a multiparty conference session for data streaming said conference session;
determining whether sufficient incoming lines are available to accommodate the conference session;
reserving at least one connection line for the conference session;
establishing a communication link, wherein the communication link is initiated by messages from a conference state control platform and includes a communication line designation; and
creating and sending a machine-readable request based on the conference request and the messages from the conference state control platform, the request being configured to automatically establish a data stream associated with a plurality of participants in the multiparty conference session, the data stream being automatically established to listen-only participants without further human intervention after receipt of the conference request; and
maintaining data for the ongoing conference session, the data comprising at least one of an identification of the listen-only participants, a communication device for each of the listen-only participants, and a status of the at least one connection line for each of the listen-only participants.

37. The method of claim 36, wherein: the request is further configured to cause the data stream associated with the multiparty conference session to be recorded.

38. The method of claim 36, wherein: the request is further configured to cause the data stream associated with the multiparty conference session to be recorded; and the request is further configured to cause the data stream to be transcoded into an Internet-playback format.

39. The method of claim 36, wherein: the request is further configured to cause the data stream associated with the multiparty conference session to be recorded; and the request is further configured to cause the data stream to be transcoded into an Internet-playback format, the transcoded data stream being subsequently distributed via the Internet.

40. A method for automatically data streaming a multiparty conference session, comprising:
receiving a request;
determining whether sufficient incoming lines are available to accommodate the conference session;
reserving at least one connection line for the conference session;
automatically establishing, upon receiving the request, a data stream associated with the multiparty conference session;
establishing a communication link between a multipoint telephony platform and a transcoding platform based on the reserved at least one connection line, wherein the communication link is initiated by messages from the conference state control platform and includes a communication line designation; and
providing said data stream to conference participants at run time of said conference session, wherein the data stream is automatically streamed to multiparty conference session participant's communication devices including, via a direct-line audio connection, to listen-only participants; and
maintaining data for the ongoing conference session, the data comprising at least one of an identification of the listen-only participants, a communication device for each of the listen-only participants, and a status of the at least one connection line for each of the listen-only participants.

41. The method of claim 40, wherein the data stream is recorded for subsequent playback.

42. The method of claim 41, wherein the recorded data stream is accessed via a packet switched network.

43. The method of claim 42, wherein the packet switched network is the Internet.

44. The method of claim 41, wherein the recorded data stream is accessed via a circuit switched network.

45. The method of claim 44, wherein the circuit switched network is a telephone network.

46. The method of claim 40, wherein the automatically establishing and providing said data stream at run time of the multiparty conference session allows for conference participation through either the Internet or a telephone network.

47. The method of claim 40, wherein the automatically establishing and providing said data stream at run time of the multiparty conference session allows for conference participation by receive-only participants, wherein each receive-only participant can observe the conference session and cannot contribute to the conference session, and wherein no additional conference resource is required for adding more receive-only participants to the conference session.

* * * * *